United States Patent
Henley

(10) Patent No.: US 7,484,290 B2
(45) Date of Patent: Feb. 3, 2009

(54) METHODS AND SYSTEM TO FACILITATE INSTALLATION AND REMOVAL OF A GENERATOR ROTOR ASSEMBLY

(75) Inventor: James Thaddeus Henley, Saratoga Springs, NY (US)

(73) Assignee: General Electric Company, Schenectady, NY (US)

( * ) Notice: Subject to any disclaimer, the term of this patent is extended or adjusted under 35 U.S.C. 154(b) by 151 days.

(21) Appl. No.: 11/359,064

(22) Filed: Feb. 22, 2006

(65) Prior Publication Data

US 2007/0193014 A1  Aug. 23, 2007

(51) Int. Cl.
*H02K 15/02* (2006.01)

(52) U.S. Cl. .............................. 29/598; 29/596; 29/732; 29/824

(58) Field of Classification Search ................. 29/592.1, 29/596, 598, 729, 732, 823–824; 310/90.5, 310/259, 268, 156.53
See application file for complete search history.

(56) References Cited

U.S. PATENT DOCUMENTS

| | | | | |
|---|---|---|---|---|
| 1,802,870 A * | 4/1931 | Brown | ......................... | 290/52 |
| 4,157,613 A * | 6/1979 | Morrow | ......................... | 29/732 |
| 4,327,479 A * | 5/1982 | Futterer et al. | ................. | 29/596 |
| 4,451,979 A * | 6/1984 | Schuster | ....................... | 29/824 |
| 4,521,953 A * | 6/1985 | King et al. | ..................... | 29/596 |
| 4,549,346 A * | 10/1985 | White | ......................... | 29/736 |
| 4,551,979 A * | 11/1985 | Wilensky | ..................... | 60/648 |
| 4,804,291 A | 2/1989 | Everett | | |
| 5,035,043 A * | 7/1991 | Newberg | ..................... | 29/596 |
| 5,056,213 A | 10/1991 | Behnke et al. | | |
| 5,337,878 A * | 8/1994 | Mehlert et al. | .............. | 198/323 |
| 5,459,918 A | 10/1995 | Uchida et al. | | |
| 6,056,685 A | 5/2000 | Nelson | | |
| 6,133,659 A | 10/2000 | Rao | | |
| 6,321,439 B1 * | 11/2001 | Berrong et al. | ................ | 29/596 |
| 6,361,275 B1 | 3/2002 | Wobben | | |
| 6,626,267 B2 * | 9/2003 | Beus et al. | ................... | 187/290 |
| 6,807,724 B2 * | 10/2004 | Yasuda et al. | .................. | 29/732 |
| 2004/0055138 A1 | 3/2004 | Tomko et al. | | |
| 2006/0013689 A1 | 1/2006 | Wobben | | |
| 2007/0193014 A1 * | 8/2007 | Henley | ......................... | 29/428 |

* cited by examiner

*Primary Examiner*—Minh Trinh
(74) *Attorney, Agent, or Firm*—Armstrong Teasdale LLP

(57) ABSTRACT

A method of installing a rotor assembly in a generator stator including a central bore is provided. The method includes coupling at least one of a first rotor section and a second rotor section of the rotor assembly to a conveyor such that at least a portion of the rotor assembly is supported by the conveyor. The method also includes moving the rotor assembly into position within the stator bore using the conveyor.

9 Claims, 12 Drawing Sheets

METHODS AND SYSTEM TO FACILITATE INSTALLATION AND REMOVAL OF A GENERATOR ROTOR ASSEMBLY

BACKGROUND OF THE INVENTION

This invention relates generally to generators, and more particularly, to methods and apparatus for installation and removal of a generator rotor assembly.

During at least some known methods of installation and removal of a rotor assembly within a generator stator bore, the rotor assembly is slid along a track using straps attached to the rotor assembly. However, sliding the rotor assembly may subject the core of the rotor assembly to the full weight of the rotor assembly.

At least some known field assemblies include a core that is fabricated from steel and copper that provides enough strength to the core to enable the core to withstand the weight of the rotor sections. However, other known rotor assembly cores are fabricated from materials that generally lack the material strength to withstand the weight of the rotor sections. Accordingly, such rotor assembly cores limit the installation and removal methods that may be used.

Generally, known methods of installing and removing a rotor assembly require a tremendous amount of effort and manipulation on the part of the technicians. Specifically, known methods may require the rotor assembly to be manipulated at several different angles with respect to the stator bore. Moreover, known methods may require the rotor assembly to be repeatedly manipulated and/or repositioned several times before it can be installed or removed.

BRIEF DESCRIPTION OF THE INVENTION

In one aspect, a method of installing a rotor assembly in a generator stator including a central bore is provided. The method includes coupling at least one of a first rotor section and a second rotor section of the rotor assembly to a conveyor such that at least a portion of the rotor assembly is supported by the conveyor. The method also includes moving the rotor assembly into position within the stator bore using the conveyor.

In a further aspect, a method of removing a rotor assembly from a generator stator including a central bore is provided. The method includes coupling at least one of a first rotor section and a second rotor section of the rotor assembly to a conveyor such that at least a portion of the weight of the rotor assembly is supported by the conveyor. The method also includes removing the rotor assembly from the stator bore using the conveyor.

In another aspect, a system to facilitate installation and removal of a rotor assembly of a generator stator is provided. The system includes a support frame assembly and a conveyor coupled to the support frame assembly and configured to couple to a first rotor section and a second rotor section of the rotor assembly such that at least a portion of the rotor assembly is supported by the conveyor.

DETAILED DESCRIPTION OF THE INVENTION

Figure 1:
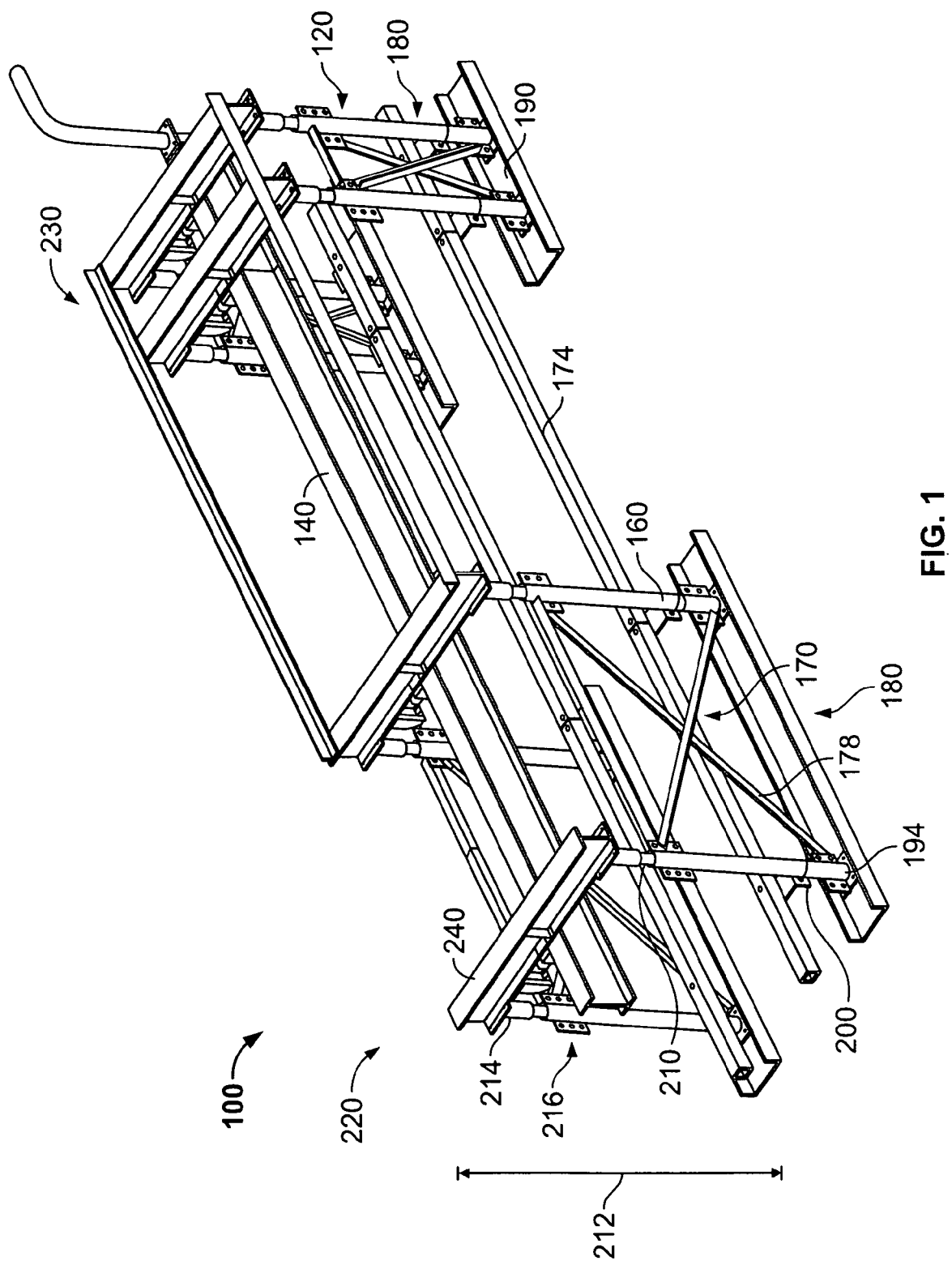
FIG. 1 is a perspective view of an assembly system for use in installing and removing a generator stator rotor assembly.
Figure 2:
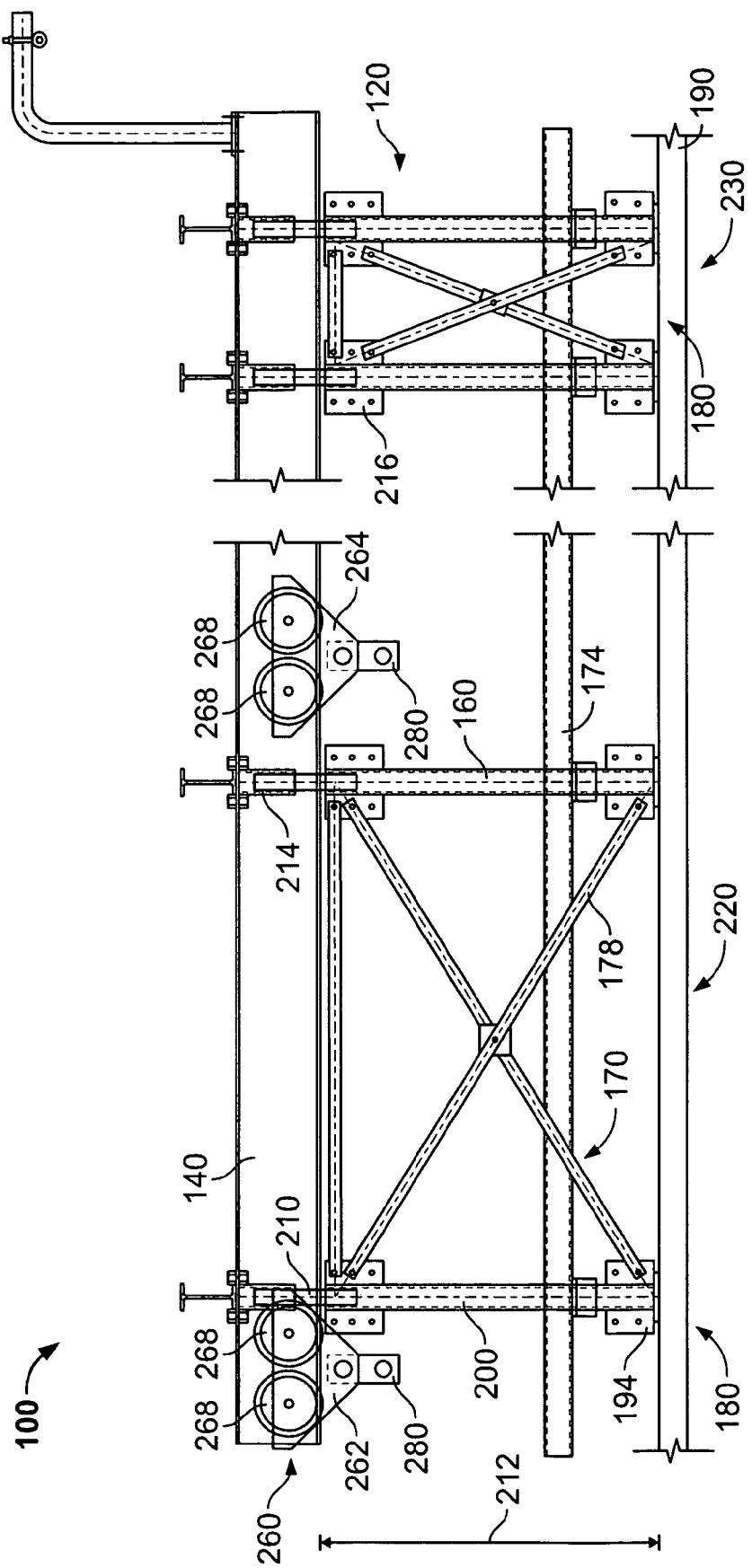
FIG. 2 is a side view of the assembly system shown in FIG. 1.

FIG. 1 is a perspective view of an assembly system 100 for use in installing and removing a generator rotor assembly (not shown in FIG. 1) through a generator stator (not shown in FIG. 1). FIG. 2 is a side view of assembly system 100. Assembly system 100 is configured to position the rotor assembly at an entry end of the generator stator. Specifically, assembly system 100 facilitates aligning the rotor assembly within and with respect to a bore defined in the generator stator. Assembly system 100 includes a support assembly 120 and a support rail 140. Support assembly 120 includes a plurality of supports 160 coupled together in a framework 170. Supports 160 extend generally vertically. Specifically, framework 170 includes a pair of opposed lateral support members 174 that extend along a full length of assembly system 100 and that are coupled to supports 160. Framework 170 also includes a plurality of auxiliary support members 178 that are arranged in X-orientations between adjacent vertical supports 160. The combination of auxiliary support members 178 and pairs of vertical supports 160 form leg assemblies 180 for assembly system 100. Each leg assembly 180 also includes a base 190 extending substantially horizontally across a bottom end 194 of vertical supports 160. In the exemplary embodiment support assembly 120 includes four leg assemblies 180. In other embodiments, support assembly 120 may include more or less than four leg assemblies 180.

In the exemplary embodiment, each vertical support 160 includes a first portion 200 and a second portion 210. Each first portion 200 is hollow and is telescopically coupled to second portion 210 such that second portion 210 is slidably received within first portion 200. As such, second portion 210 is slidable within first portion 200 such that a height 212 of support assembly 120, measured from base 190 to an outer tip 214 of vertical support 160, can be adjusted. In the exemplary embodiment, a plurality of fastening mechanisms 216 are used to set height 212 of assembly system 100. In alternative embodiments, vertical supports 160 can be adjusted using any of hydraulically adjustable supports, screw actuators, and/or any other adjustable supports that enable height 212 of system 100 to be adjusted as described herein.

In the exemplary embodiment, leg assemblies 180 are coupled in a rectangular orientation such that a first pair of leg assemblies 180 define a front section 220 of assembly system 100, and such that a second pair of leg assemblies 180 define a rear section 230 of assembly system 100. A plurality of top supports 240 extend between, and are coupled to, each pair of leg assemblies 180. Support rail 140 is also coupled to top supports 240 such that rail 140 extends through, and is centered within, assembly system 100 and extends from rear section 230 to front section 220. Assembly system 100 is positioned such that rail 140 and lateral support members 174 extend outward from legs 180 towards the entry end of the generator stator bore.

Assembly system 100 includes a conveyor 260 that is coupled to rail 140 such that conveyor 260 is moveable either towards, or away from, the generator stator bore along a full length of rail 140. In the exemplary embodiment, conveyor 260 includes a pair of trolleys 262 and 264 that are each coupled to rail 140 by a pair of wheels 268. In an alternative embodiment, conveyor 260 may be, but is not limited to being, a wheel assembly, a slide assembly, a rack and pinion assembly, or any other assembly that enables conveyor 260 to function as described herein. In a further embodiment, conveyor 260 may be, but is not limited to being, one of any combination of a wheel assembly, a slide assembly, a rack and pinion assembly, and/or any other assembly that enables conveyor 260 to function as described herein.

Conveyor 260 includes an attachment mechanism 280 that is suspended from trolleys 262 and 264 and is configured to couple a rotor assembly (not shown in FIG. 2) to assembly system 100 such that the rotor assembly is suspended from rail 140. Specifically, the rotor assembly is coupled to conveyors 260 such that it is suspended within assembly system 100 between opposing pairs of legs 180. More specifically, when coupled to assembly system 100, the rotor assembly is suspended below rail 140 a distance off the ground and is substantially centered between lateral supports 174. Lateral supports 174 provide structural support to assembly system 100 such that swaying of the rotor assembly within assembly system 100 when it is suspended from rail 140 is facilitated to be prevented.

Before use, vertical supports 160 are adjusted to facilitate positioning the rotor assembly with respect to the generator stator bore. The rotor assembly is then coupled to conveyor 260. Through conveyor 260, the rotor assembly is moved into position within the stator bore. Furthermore, the alignment of the rotor assembly may be adjusted at any time by adjusting a height of vertical supports 160.

Figure 3:
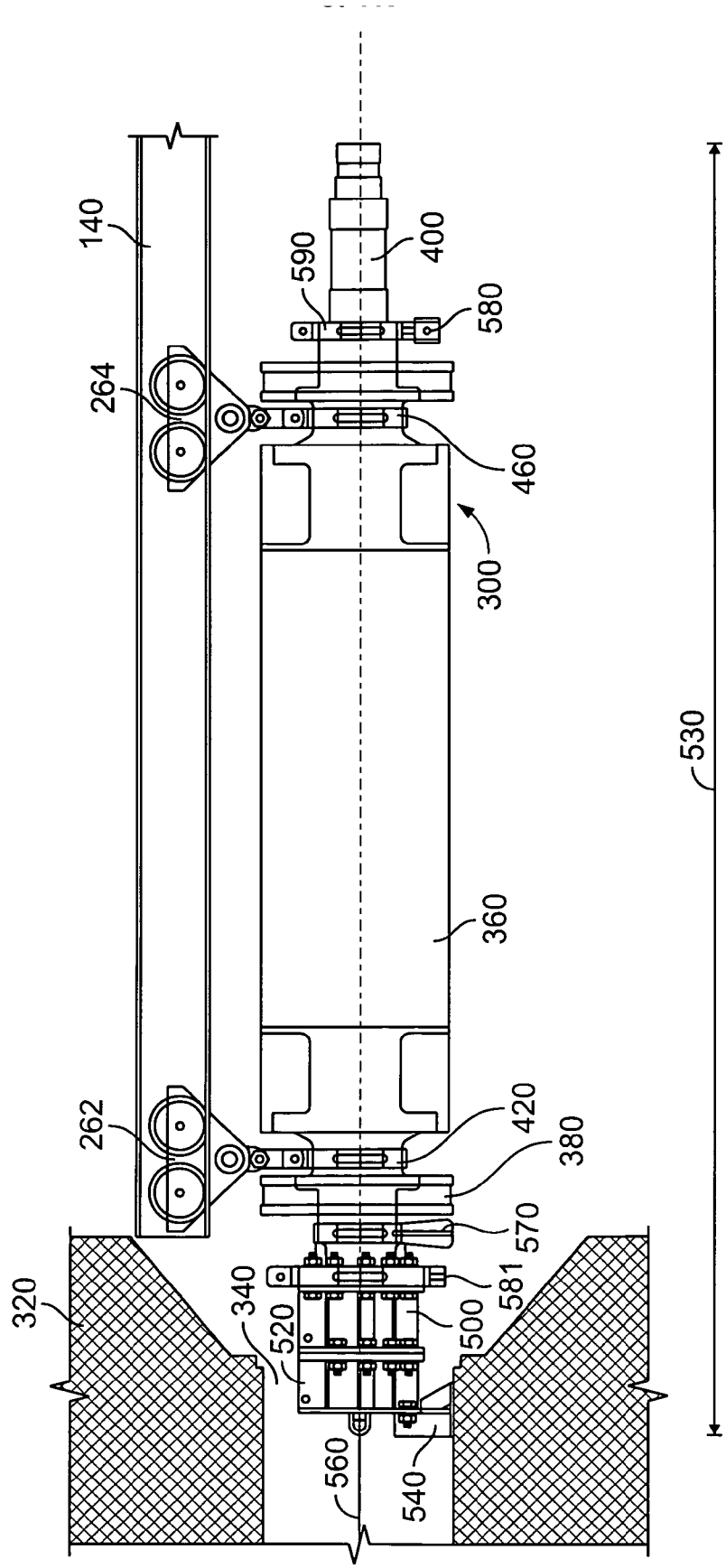
FIG. 3 is a side view of the assembly system shown in FIG. 2 and coupled to a rotor assembly prepared for insertion into a stator bore.
Figure 4:
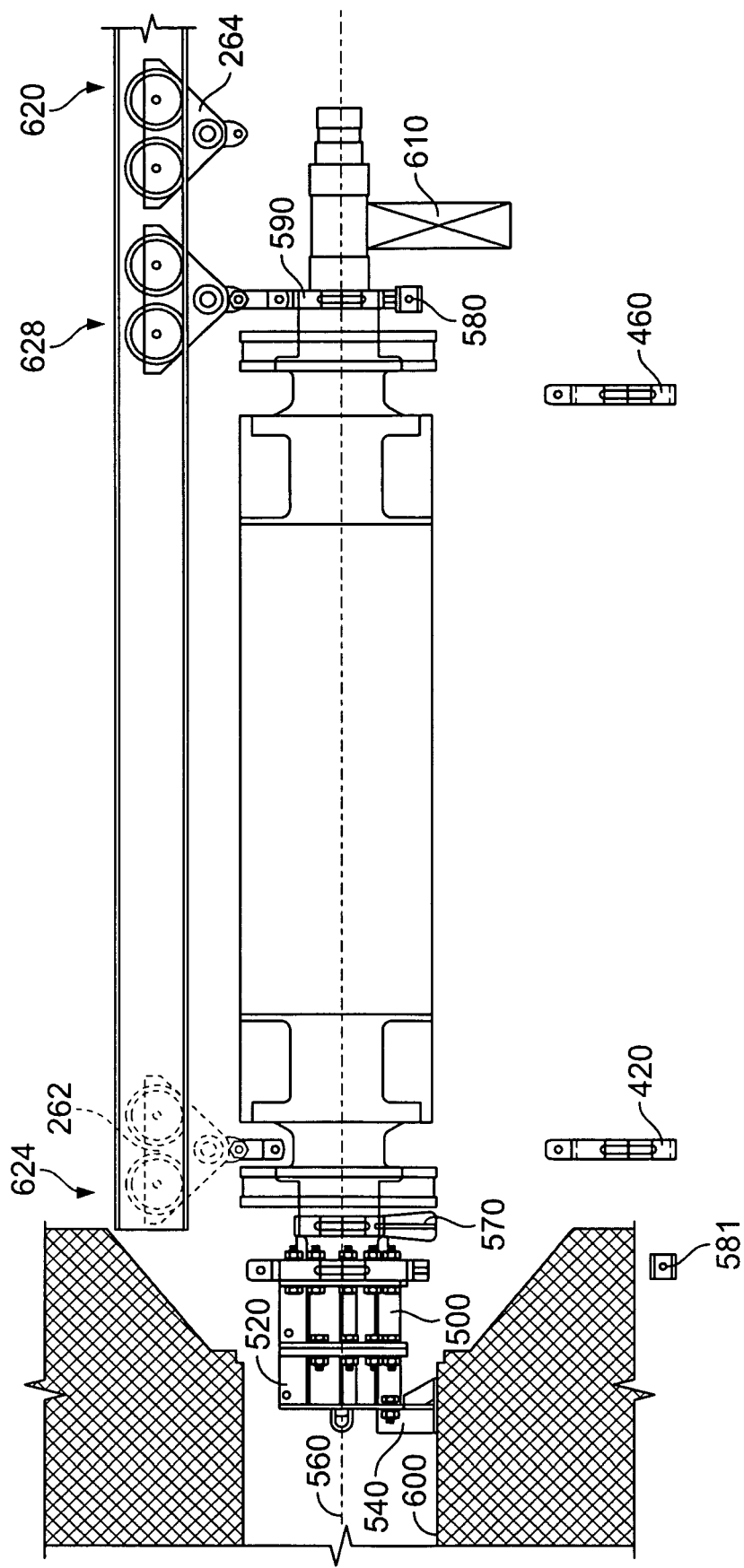
FIG. 4 is a side view of the rotor assembly shown in FIG. 3, and initially inserted into the stator bore.
Figure 5:
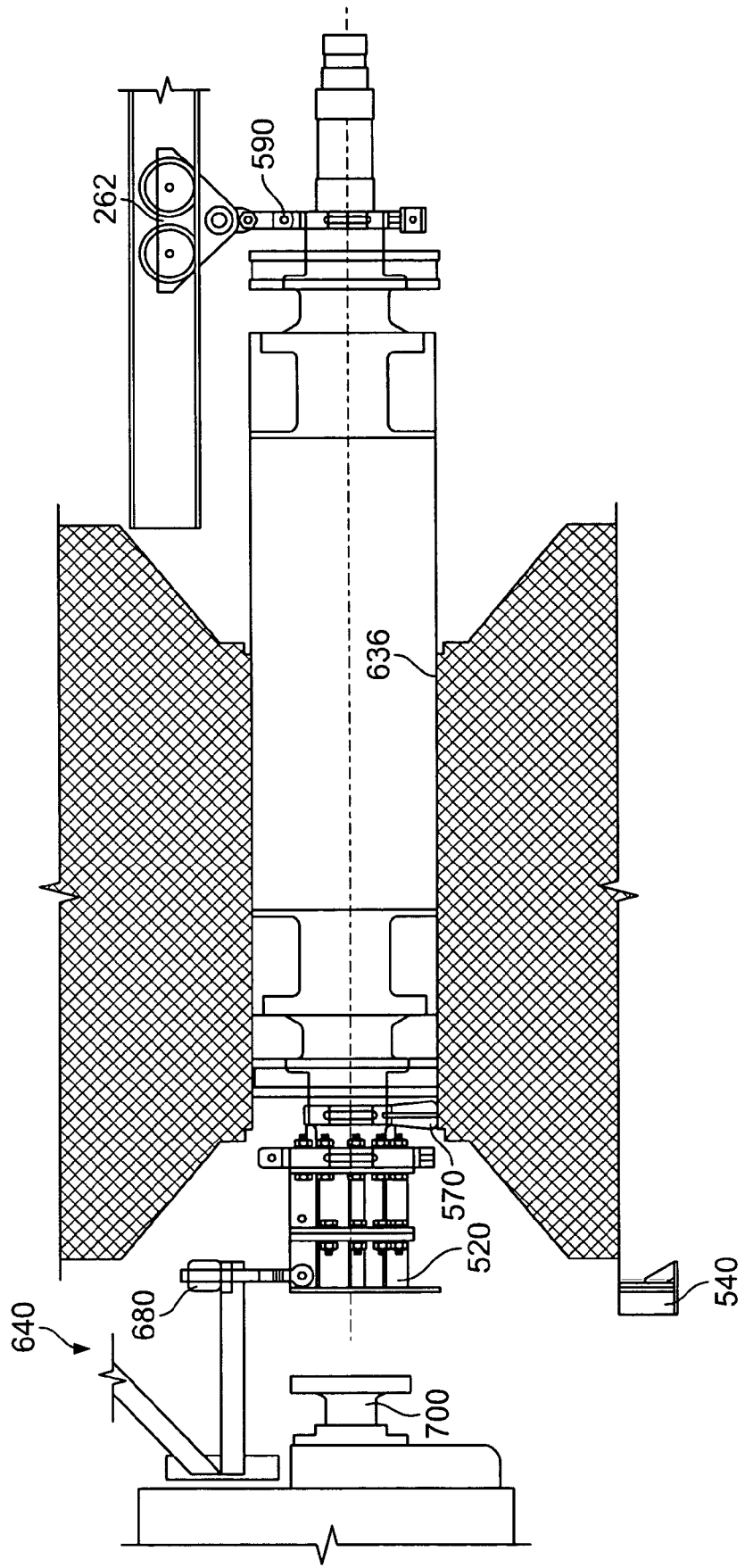
FIG. 5 is a side view of the rotor assembly shown in FIG. 3 and inserted through the stator bore such that an outer stub clamp shown in FIG. 3 is accessible at a gear end of the generator stator.
Figure 6:
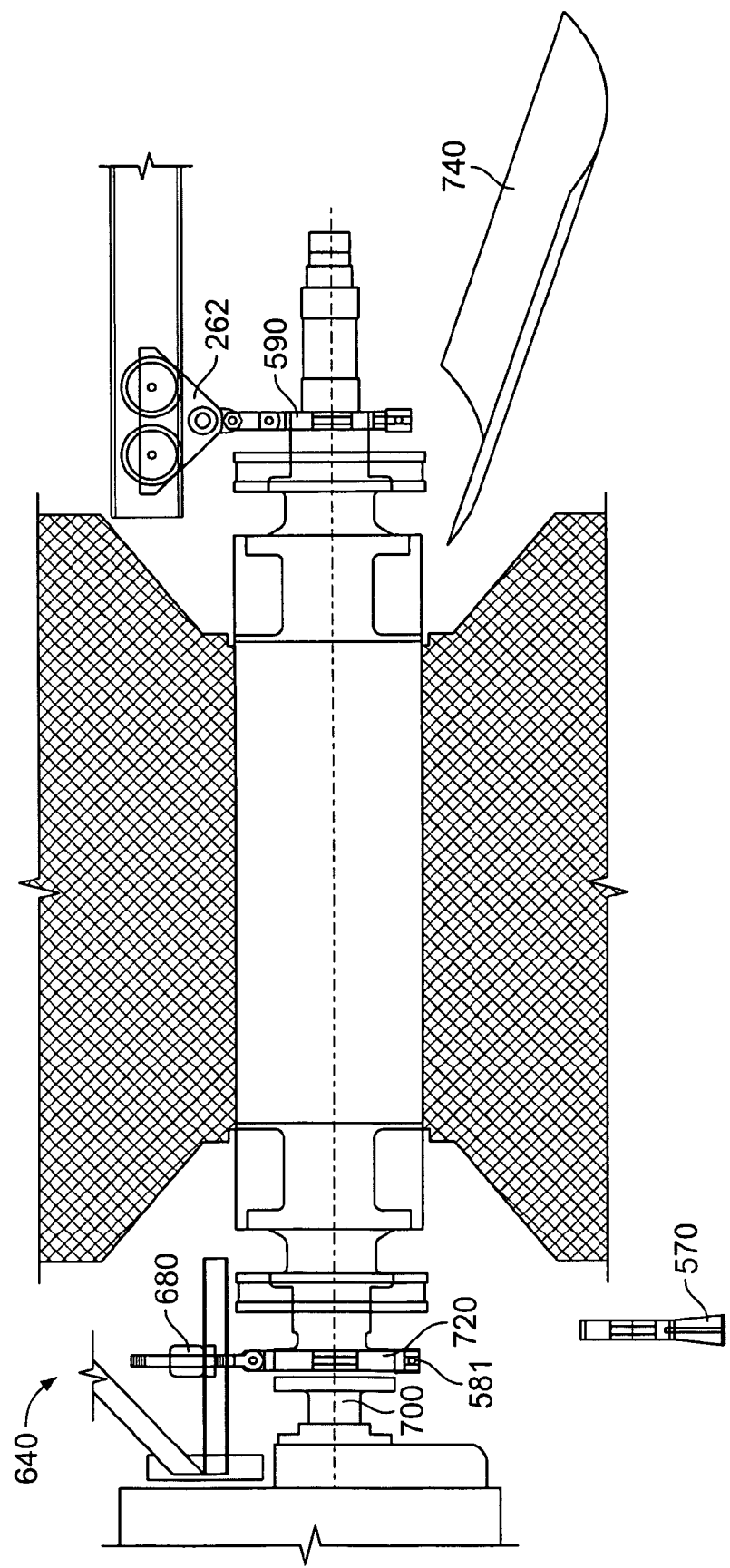
FIG. 6 is a side view of the rotor assembly shown in FIG. 3 and inserted through the stator bore such that a first rotor is substantially flush with the gear shown in FIG. 5.
Figure 7:
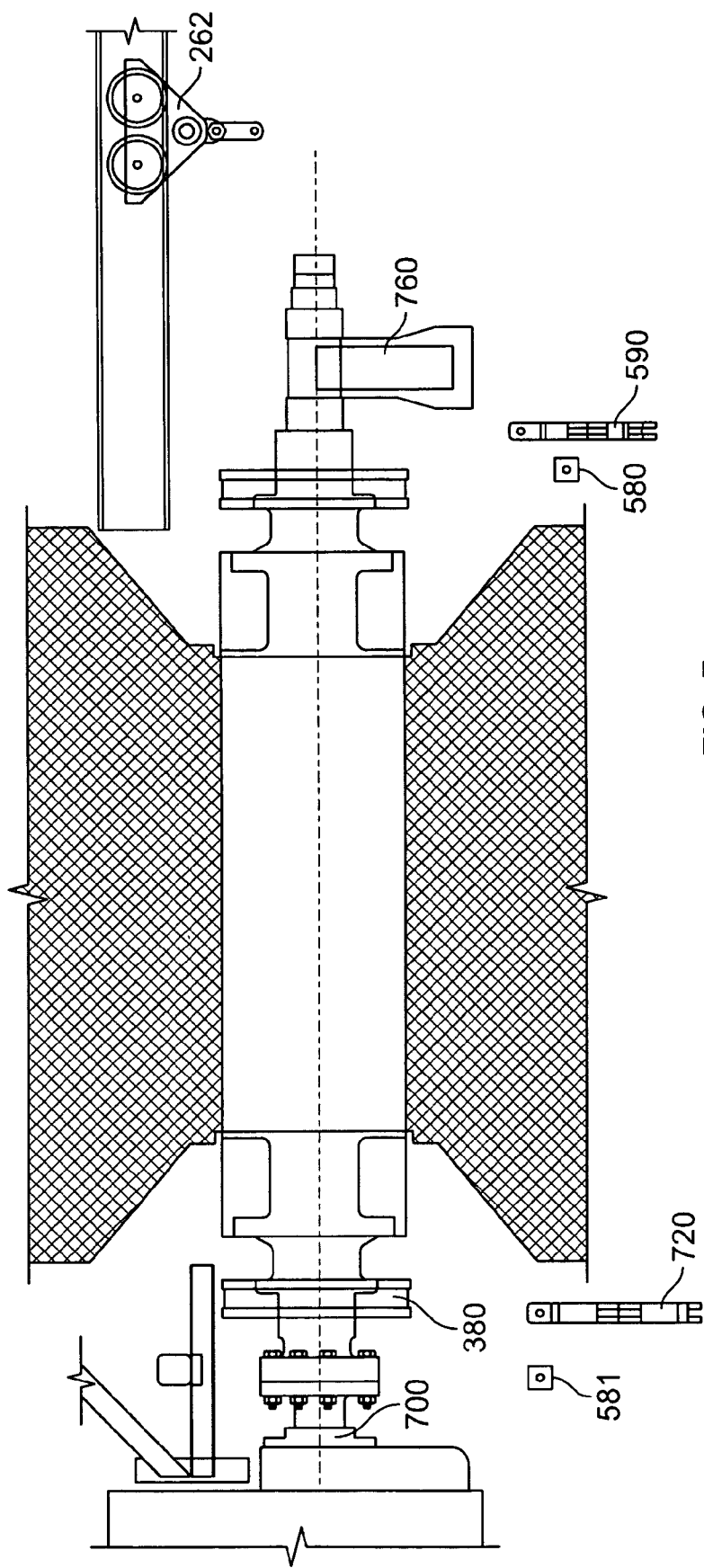
FIG. 7 is a side view of the rotor assembly shown in FIG. 3 and coupled to the gear.

FIGS. 3-7 illustrate subsequent stages of installation of a rotor assembly 300 into a bore 340 of a generator stator 320 using assembly system 100. For clarity, support assembly 120 is not illustrated in FIGS. 3-7. Specifically, FIG. 3 is a side view of rotor assembly 300 prepared to be inserted into stator bore 340, FIG. 4 is a side view of an initial insertion of rotor assembly 300 within stator bore 340, and FIG. 5 is a side view of subsequent installation of rotor assembly 300 within stator bore 340, and positioned such that an outer stub clamp 520 is accessible at a gear end 640 of generator stator 320. FIG. 6 illustrates rotor assembly 300 within stator bore 340 and positioned such that a first rotor 380 is substantially flush against a generator gear 700, and FIG. 7 is a side view of rotor assembly 300 coupled to generator gear 700.

Assembly system 100 supports rotor assembly 300 such that no pressure or weight is induced to a rotor assembly core 360. Specifically, rotor assembly core 360 includes a first rotor 380 and a second rotor 400. Core 360 is coupled to assembly system 100 such that rotor assembly 300 is suspended from rail 140 and is substantially centered within assembly system 100. More specifically, when suspended within assembly system 100, first rotor 380 is coupled to a first clamp 420 suspended from first trolley 262, and second rotor 400 is coupled to a second clamp 460 suspended from second trolley 264. In this orientation, rotor assembly 300 can be moved into stator bore 340 via trolleys 262 and 264.

An inner stub clamp or stub shaft 500 and an outer stub clamp or stub shaft 520 extend from first rotor 380. Inner stub clamp 500 and outer stub clamp 520 provide additional coupling points for assembly system 100 that facilitate positioning of rotor assembly 300 within stator bore 340. Outer stub clamp 520 includes a shoe 540 that extends downward therefrom, and a tension member 560 that extends axially therefrom. In the exemplary embodiment, tension member 560 is a tow cable. Alternatively, tension member 560 may be, but is not limited to being, a tension rod, a hydraulic shaft, or any other device that facilitates positioning rotor assembly 300 as described herein.

A second shoe 570 extends outward from first rotor 380. Second shoe 570 facilitates supporting rotor assembly 300 as rotor assembly 300 is inserted within stator bore 340. In addition, inner stub clamp 500 includes a stabilizer 580 coupled thereto. A second stabilizer 581 is coupled to second rotor section 400 via a third clamp 590. Stabilizers 580 and 581 contact lateral support members 174 to facilitate preventing swaying of rotor assembly 300 such that rotor assembly 300 remains substantially centered within assembly system 100.

Before inserting rotor assembly 300 within bore 340, a skid pan (not shown) is positioned substantially flush against an outer surface 600 defining bore 340, and vertical supports 160 are adjusted to facilitate aligning rotor assembly 300 with respect to bore 340. Trolleys 262 and 264 are translated along rail 140 while tension applied to tension member 560 causes rotor assembly 300 to move towards bore 340. During movement, swaying of rotor assembly 300 is prevented by stabilizers 580 and 581, and by lateral supports 174. Rotor assembly 300 is then moved until shoe 540 is positioned above the skid pan. Vertical supports 160 are adjusted to position shoe 540 substantially flush against the skid pan. As such, rotor assembly 300 is supported by both trolleys 262 and 264, and by shoe 540.

Rotor assembly 300 is then also temporarily supported by a support member 610 positioned under second rotor section 400. Both trolleys 262 and 264 are then uncoupled from rotor assembly 300. Specifically, trolley 264 and clamp 460 are uncoupled from second rotor 400, and trolley 262 and clamp 420 are uncoupled from first rotor section 380. Trolley 264 is repositioned at an end 620 of rail 140, and trolley 262 is repositioned from a first position 624, aligned with first rotor 380, to a second position 628, aligned with second rotor 400. Trolley 262 is then coupled to second rotor 400 via third clamp 590. Stabilizer 581 is also uncoupled from inner stub clamp 500 to enable rotor assembly 300 to be inserted within bore 340.

Support member 610 is removed from beneath second rotor 400 such that rotor assembly 300 is supported by trolley 262 and by shoe 540. Rotor assembly core 360 is moved into bore 340 by sliding trolley 262 and through tension applied to tension member 560. As core 360 approaches bore 340 a measurement gauge (not shown) is used to ensure an adequate circumferential gap 636 is defined between a circumference of core 360 and bore surface 600. Specifically, the gauge is used to ensure that core 360 is substantially centered within stator bore 340. If necessary, assembly system 100 is adjusted to reposition core 360 relative to bore 340. During installation of core 360 within bore 340 adjustments may be made to assembly system 100 to prevent core 360 from contacting bore 340.

During subsequent insertion, tension member 560 and shoe 540 are removed. During this phase of installation, rotor assembly 300 is supported by second shoe 570 and trolley 262 via third clamp 590. A second conveyor 680 is located at a gear end 640 of generator stator 320 and is coupled to outer stub clamp 520. Conveyor 680 may be, but is not limited to being, a trolley assembly, a wheel assembly, a slide assembly, a rack and pinion assembly and/or any device that enables rotor assembly 300 to move as described herein. In an alternative embodiment, conveyor 680 may be, but is not limited to being, one of any combination of a wheel assembly, a slide assembly, a rack and pinion assembly, and/or any other assembly that enables conveyor 260 to function as described herein.

Movement of second conveyor 680 and trolley 262 causes rotor assembly 300 to be moved further into bore 340 and causes outer stub clamp 520 to contact a generator gear 700. Outer stub clamp 520 is then coupled to generator gear 700 to facilitate supporting rotor assembly 300. More specifically, at this phase of installation, rotor assembly 300 is supported by generator gear 700 and trolley 262, and conveyor 680 may be uncoupled from outer stub clamp 520 and coupled to inner stub clamp 500. Outer stub clamp 520 is then uncoupled from both generator gear 700 and first rotor 380.

Rotor assembly 300 is supported by trolley 262 and second conveyor 680 via inner stub clamp 500. Second conveyor 680 and trolley 262 are then moved to cause rotor assembly 300 to move further into bore 340 and to cause inner stub clamp 500 to contact generator gear 700. Inner stub clamp 500 is then coupled to generator gear 700 such that rotor assembly 300 is supported by generator gear 700 and trolley 262. Conveyor 680 is then uncoupled from inner stub clamp 500 and coupled to first rotor 380 via a fourth clamp 720. Furthermore, a stabilizer 580 is connected to fourth clamp 720 to facilitate preventing swaying of rotor assembly 300. Inner stub clamp 500 is uncoupled from first rotor 380 and generator gear 700 such that rotor assembly 300 is supported by trolley 262 and conveyor 680. Conveyor 680 and trolley 262 are then moved causing rotor assembly 300 to be inserted further into bore 340 and such that first rotor 380 contacts generator gear 700. First rotor 380 is then coupled to generator gear 700.

A pedestal 760 is positioned under second rotor 400 such that rotor assembly 300 is supported by generator gear 700 and pedestal 760. Skid pan 740 is then removed from between rotor assembly core 360 and stator bore surface 600, and second shoe 570 is also removed. Next, both trolley 262 and conveyor 680 are uncoupled from rotor assembly 300, and stabilizers 580 and 581 are removed. Finally, fourth clamp 720 and second clamp 460 are removed. Rotor assembly 300 is now positioned within stator bore 340 and prepared for operation.

The above-described methods and system facilitate the installation of a rotor assembly within a generator stator bore. Specifically, the above-described methods and system enable the rotor assembly to be inserted without requiring excessive or awkward repositioning of the rotor assembly. More specifically, repeated manipulation at several different angles is limited by the above-described methods and system. Furthermore, the above-described methods and system facilitate providing a means to insert a rotor assembly without having to apply pressure or weight to the rotor assembly core. As a result, the rotor assembly can be inserted by a means that is both reliable and cost effective.

Figure 8:
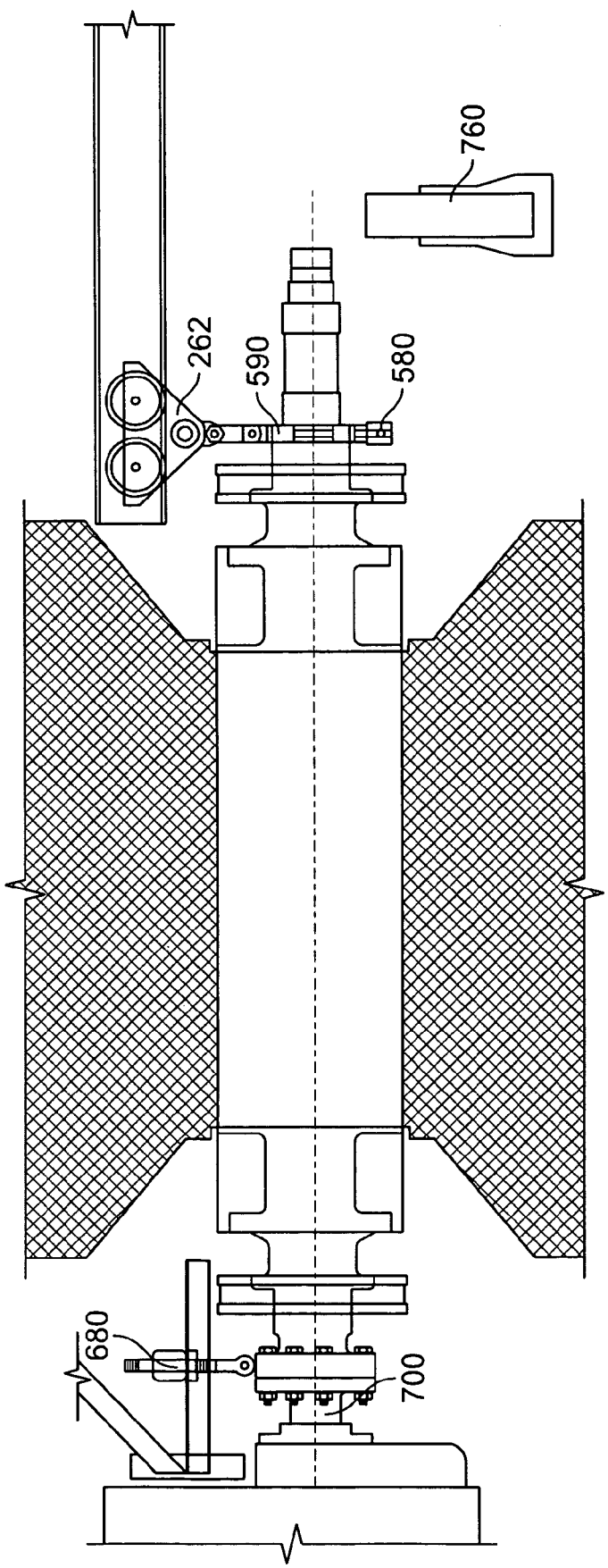
FIG. 8 is a side view of the rotor assembly shown in FIG. 7 and being prepared for removal from the stator bore.
Figure 9:
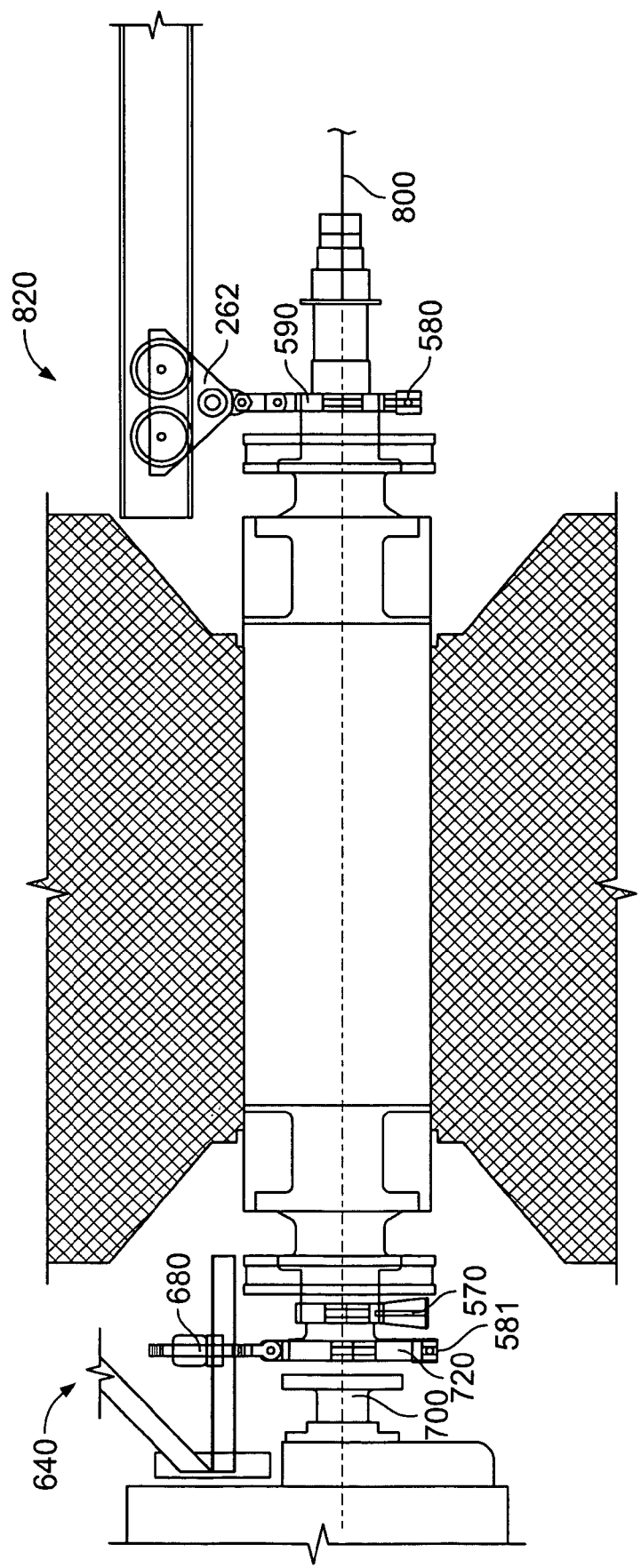
FIG. 9 is a side view of the rotor assembly shown in FIG. 8 and disconnected from the gear.
Figure 10:
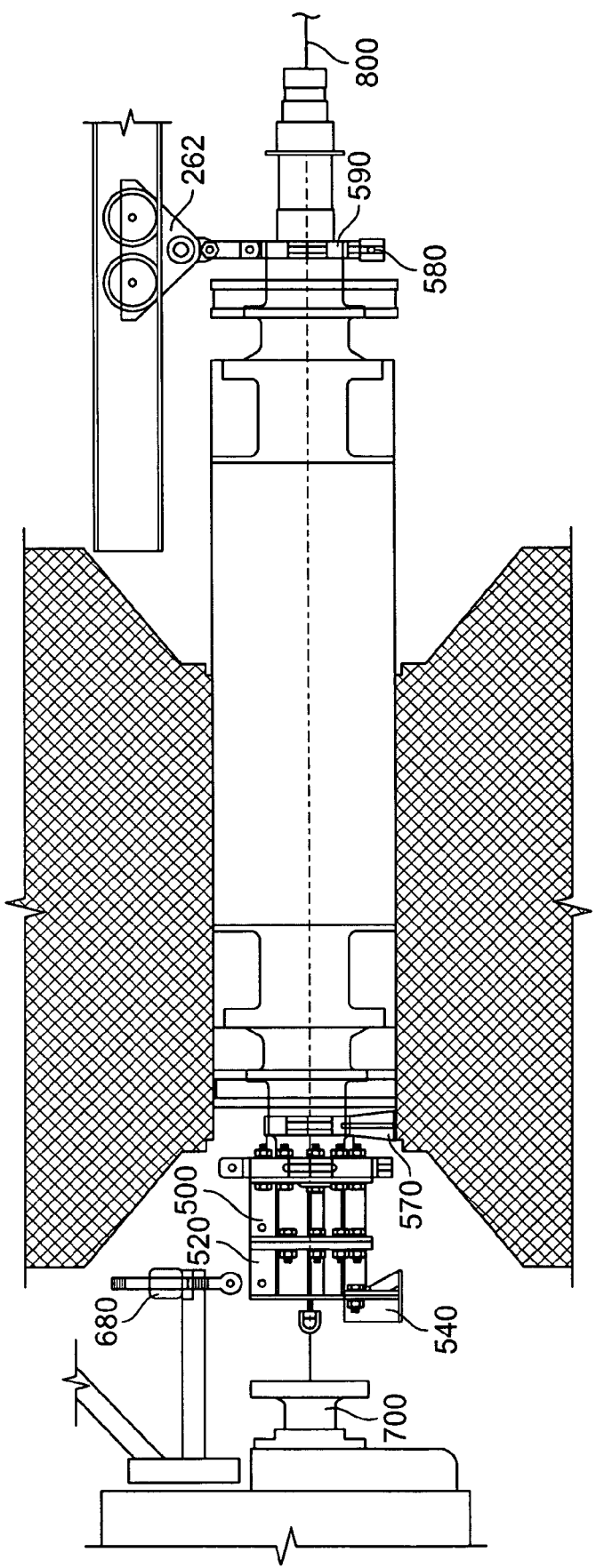
FIG. 10 is a side view of the rotor assembly shown in FIG. 8 and positioned such that the rotor assembly shown in FIG. 8 is supported by a shoe and a trolley.
Figure 11:
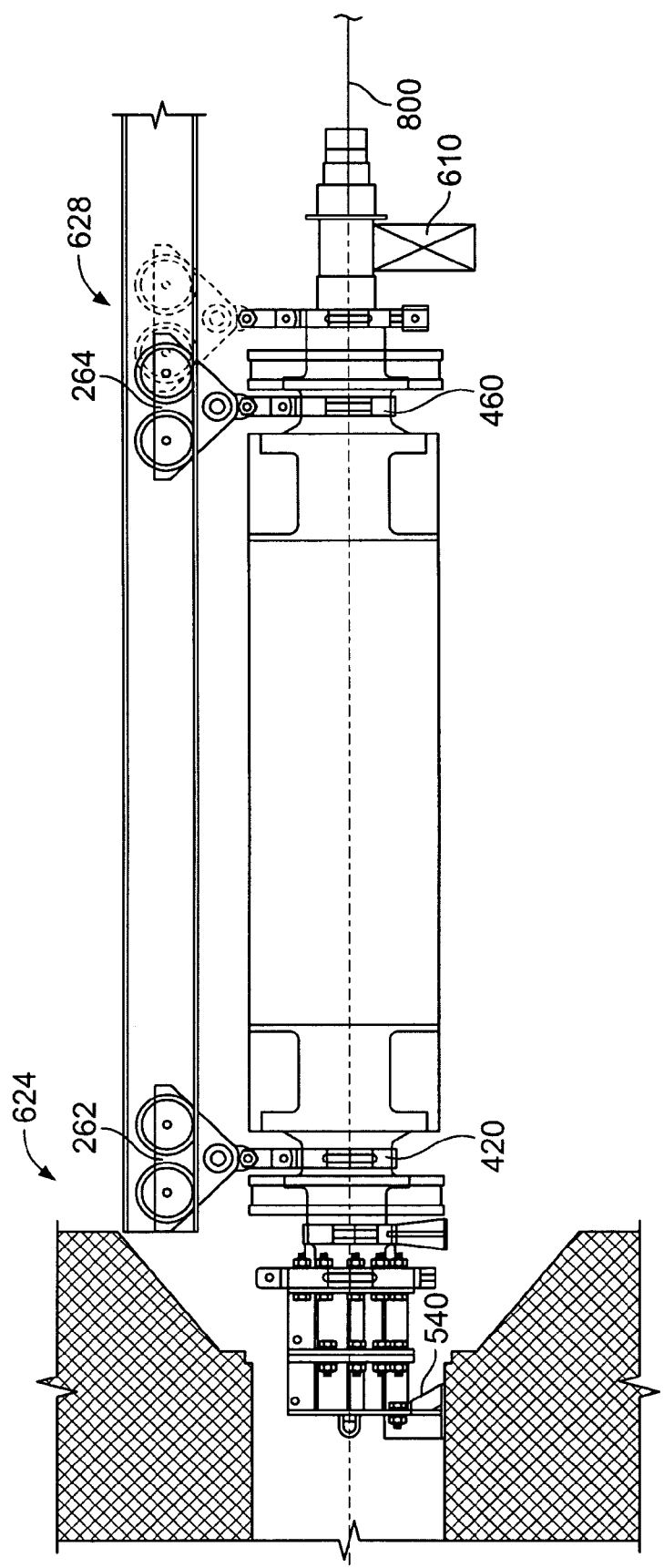
FIG. 11 is a side view of the rotor assembly shown in FIG. 8 and positioned at an entry end of the stator bore.
Figure 12:
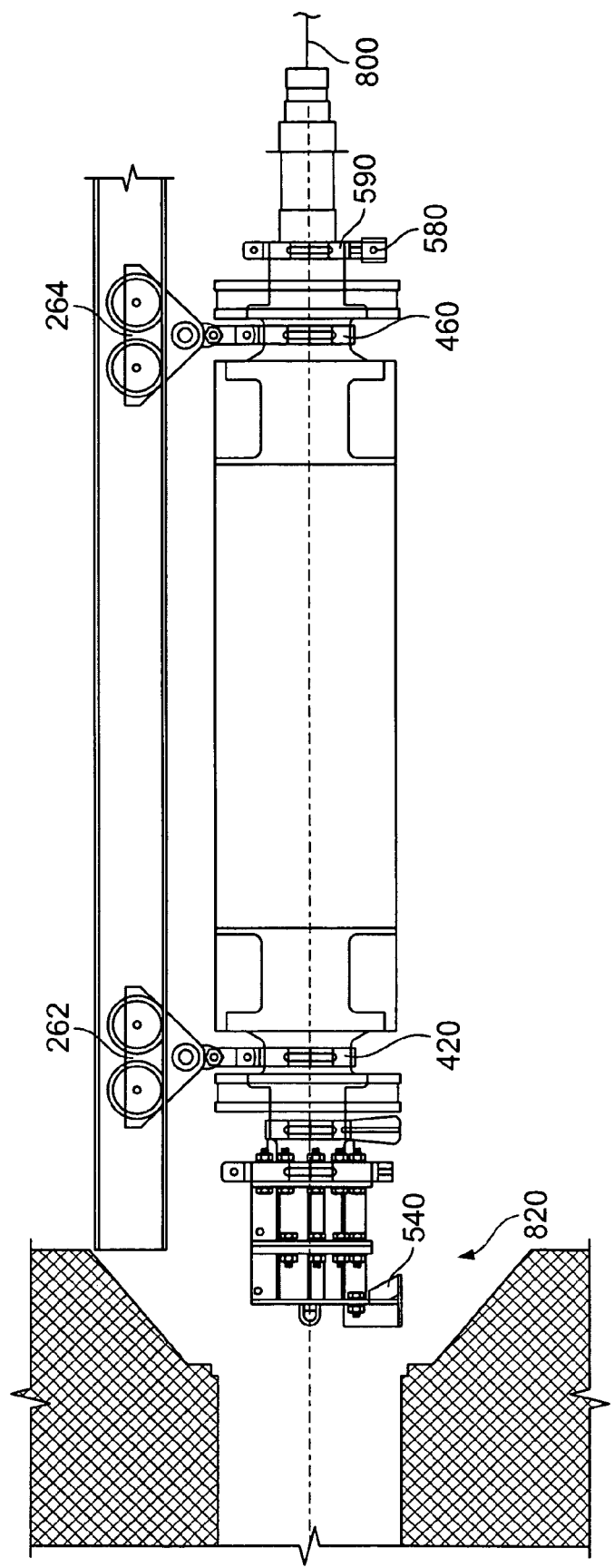
FIG. 12 is a side view of the rotor assembly shown in FIG. 8 and removed from the generator stator.

FIGS. 8-12 illustrate subsequent stages of removal of a rotor assembly 300 from a bore 340 of a generator stator 320 using assembly system 100. For clarity, support assembly 120 is not illustrated in FIGS. 8-12. Specifically, FIG. 8 is a side view of rotor assembly 300 prepared to be removed from stator bore 340, FIG. 9 is a side view of an initial removal of rotor assembly 300, and FIG. 10 is a side view of subsequent removal of rotor assembly 300 from stator bore 340 and positioned such that rotor assembly 300 is supported by shoe 540 and trolley 262. FIG. 11 is a side view of rotor assembly 300 moved to an entry end of stator bore 340 and FIG. 12 is a side view of rotor assembly 300 completely removed from generator stator 320.

Prior to removal, trolley 262 is coupled to second rotor 400 via third clamp 590. Third clamp 590 includes a stabilizer 580 coupled thereto to make contact with lateral support members 174 to facilitate preventing swaying of rotor assembly 300 during removal. Pedestal 760 is removed from second rotor 400 causing rotor assembly 300 to be supported by generator gear 700 and trolley 262 via third clamp 590. Skid pan 740 is positioned between rotor assembly core 360 and stator bore surface 600 to enable translation of rotor assembly 300 through bore 340.

First rotor 380 is coupled to conveyor 680 via fourth clamp 720, and a tension member 800 is extended axially from second rotor 400. First rotor 380 is then uncoupled from generator gear 700 such that rotor assembly 300 is supported by conveyor 680 and trolley 262. A stabilizer 581 is coupled to fourth clamp 720 and shoe 570 is coupled to first rotor 380. First rotor 380 is then uncoupled from generator gear 700 such that tension applied to tension member 800 and translation of conveyor 680 and trolley 262 enable rotor assembly 300 to move out of stator bore 340. Rotor assembly 300 is moved until a distance between generator gear 700 and first rotor 380 is wide enough to enable inner stub clamp 500 to be coupled to first rotor 380.

Inner stub clamp 500 is coupled to first rotor 380 and then to generator gear 700 such that rotor assembly 300 is supported by generator gear 700 and trolley 262. Conveyor 680 is uncoupled from fourth clamp 720 and coupled to inner stub clamp 500. Inner stub clamp 500 is removed from generator gear 700, and stabilizer 580 is also removed, enabling rotor assembly 300 to move due to tension applied to tension member 800 and due to translation of conveyor 680 and trolley 262. Rotor assembly 300 is moved until a distance between generator gear 700 and inner stub clamp 500 is wide enough to enable outer stub clamp 520 to be coupled to inner stub clamp 500.

Outer stub clamp 520 is coupled to inner stub clamp 500 and then to generator gear 700 such that rotor assembly 300 is supported by generator gear 700 and trolley 262. Conveyor 680 is uncoupled from inner stub clamp 500 and coupled to outer stub clamp 520. Outer stub clamp 520 is removed from generator gear 700 such that rotor assembly 300 is moved by tension applied to tension member 800 and by translation of conveyor 680 and trolley 262.

Rotor assembly 300 is moved until shoe 540 contacts skid pan 740. Conveyor 680 is removed from outer stub clamp 520. During subsequent removal of rotor assembly 300, shoe 540 slides along skid pan 740 such that rotor assembly 300 is supported by trolley 262 and shoe 540. When rotor assembly 300 reaches an entry end 820 of stator bore 340, support member 610 is positioned beneath second rotor 400 such that rotor assembly 300 is supported by support member 610 and by shoe 540.

Trolley 262 is uncoupled from second rotor 400 and repositioned from a second position 628, aligned with second rotor 400, to a first position 624, aligned with first rotor 380. Trolley 262 is then coupled to first rotor 380 via clamp 420, and trolley 264 is coupled to second rotor 400 via clamp 460. Support member 610 is removed such that rotor assembly 300 is supported by trolleys 262 and 264. Tension applied to tension member 800 and translation of trolleys 262 and 264 facilitates removing rotor assembly 300 from generator stator 320.

The above-described methods and system facilitate the removal of a rotor assembly from a generator stator bore. Specifically, the above-described methods and system enable the rotor assembly to be removed without requiring excessive or awkward repositioning of the rotor assembly. More specifically, repeated manipulation at several different angles is limited by the above-described methods and system. Furthermore, the above-described methods and system facilitate providing a means to remove a rotor assembly without having to apply pressure or weight to the rotor assembly core. As a result, the rotor assembly can be removed by a means that is both reliable and cost effective.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Although the methods and systems described herein are described in the context of inserting and removing a rotor assembly for a generator, it is understood that the methods and systems described herein are not limited to field assemblies or generators. Likewise, the system components illustrated are not limited to the specific embodiments described herein, but rather, components of the system can be utilized independently and separately from other components described herein.

While the invention has been described in terms of various specific embodiments, those skilled in the art will recognize that the invention can be practiced with modification within the spirit and scope of the claims.

What is claimed is:

1. A method of installing a rotor assembly in a generator stator including a central bore, said method comprising:
   providing a generator assembly system including a trolley, a conveyor, and a shoe, operatively associated with the rotor assembly;
   coupling at least one of a first rotor section and a second rotor section of the rotor assembly to the conveyor such that at least a portion of the rotor assembly is supported by the conveyor;
   coupling the shoe to at least one of the first and second rotor sections to facilitate supporting the rotor assembly;
   moving the rotor assembly into position within the central bore defined in the stator using the conveyor;
   coupling the first rotor section to a reduction gear in the generator; and
   coupling the second rotor section to a pedestal such that at least a portion of the rotor assembly is supported by the pedestal.

2. The method in accordance with claim 1 further comprising:
   coupling a stub shaft to one of the first rotor section and the second rotor section;
   positioning a skid pan in the central bore; and
   supporting at least a portion of the rotor assembly with the stub shaft.

3. The method in accordance with claim 2 further comprising coupling a stabilizer to at least one of the first and second rotor sections.

4. The method in accordance with claim 1 wherein coupling at least one of a first rotor section and a second rotor section of the rotor assembly to a conveyor further comprises coupling at least one of the first and second rotor sections to the conveyor using clamps.

5. A method in accordance with claim 1 further comprising moving the rotor assembly through the central bore by applying tension to the first rotor section to cause the rotor assembly to move towards the central bore.

6. A method of removing a rotor assembly from a generator stator including a central bore, said method comprising:
   providing a generator assembly system including a trolley, a conveyor, and a shoe, operatively associated with the rotor assembly;
   coupling at least one of a first rotor section and a second rotor section of the rotor assembly to a conveyor such that at least a portion of the weight of the rotor assembly is supported by the conveyor;
   coupling the shoe to at least one of the first and second rotor sections to facilitate supporting the rotor assembly;
   uncoupling the second rotor section from a pedestal;
   uncoupling the first rotor section from a reduction gear in the generator; and removing the rotor assembly from the central bore defined in the stator using the conveyor.

7. The method in accordance with claim 6 further comprising:
   coupling a stub shaft to one of the first rotor section and the second rotor section;
   positioning a skid pan in the central bore; and
   supporting at least a portion of the rotor assembly with the stub shaft.

8. The method in accordance with claim 6 further comprising coupling at least one of the first and second rotor sections to the conveyor using clamps.

9. A method in accordance with claim 6 further comprising moving the rotor assembly through the central bore by applying tension to the second rotor section to cause the rotor assembly to move outward from the central bore.

* * * * *